United States Patent
Jolin

(10) Patent No.: US 11,412,361 B1
(45) Date of Patent: Aug. 9, 2022

(54) METHOD AND SYSTEM FOR SIGNIFICANTLY IMPROVING WIRELESS CONNECTIVITY AND SELECTABILITY OF CELL TOWERS FOR DATA TRANSFER

(71) Applicant: INSTY CONNECT, LLC, Dickson, TN (US)

(72) Inventor: Nicolas M. Jolin, McEwen, TN (US)

(73) Assignee: INSTY CONNECT, LLC, Dickson, TN (US)

( * ) Notice: Subject to any disclaimer, the term of this patent is extended or adjusted under 35 U.S.C. 154(b) by 0 days.

(21) Appl. No.: 17/566,852

(22) Filed: Dec. 31, 2021

(51) Int. Cl.
- *H04W 4/48* (2018.01)
- *H01Q 1/24* (2006.01)
- *H04W 40/02* (2009.01)
- *H04B 7/0413* (2017.01)

(52) U.S. Cl.
CPC .............. *H04W 4/48* (2018.02); *H01Q 1/246* (2013.01); *H04B 7/0413* (2013.01); *H04W 40/02* (2013.01)

(58) Field of Classification Search
CPC ........ H04W 4/48; H04W 40/02; H01Q 1/246; H04B 7/0413
See application file for complete search history.

(56) References Cited

U.S. PATENT DOCUMENTS

2017/0302774 A1* 10/2017 Lei .................... H04M 1/72412

* cited by examiner

*Primary Examiner* — Fred A Casca
(74) *Attorney, Agent, or Firm* — Hulsey P.C.

(57) ABSTRACT

A system, device and medium for providing internet to user devices are described. The system is designed to provide high speed internet using cellular networks. The system comprises exterior unit which is placed in open environment and router unit which is placed in proximity to the user devices. The exterior unit comprises the detachable cellular modem and antenna and modem housing arrangement. The detachable cellular modem includes SIM slot unit to accommodate SIMS, and connectors. The antenna and modem housing arrangement includes antenna arrangement to accommodate the antennas at slant polarization, and a modem holding housing to accommodate the detachable cellular modem. One may appreciate that the system is designed using detachable cellular modem, placed at outdoors along with antennas, to provision less complex and adaptable system for lossless transmission of signals to modem and efficient internet access to multiple user devices.

11 Claims, 14 Drawing Sheets

METHOD AND SYSTEM FOR SIGNIFICANTLY IMPROVING WIRELESS CONNECTIVITY AND SELECTABILITY OF CELL TOWERS FOR DATA TRANSFER

FIELD

Embodiments of the present invention relate to cellular communication networks. In particular, embodiments of the present invention relate to system for providing internet to one or more user devices. More particularly, the present disclosure provides a method and system for significantly improving wireless connectivity and selectability of cell towers for data transfer.

DESCRIPTION OF THE RELATED ART

A cellular data network is a data connection from the cellular device to cell site, e.g., cell tower. A cellular device may need to be within coverage area of the cell tower to receive cellular signals. Cellular devices include antennas, modem and router, with capability of receiving signals from the cell tower, convert the signals to data stream and encapsulate the data stream to provide to user devices for data transfer and provide access to internet to users.

Conventionally, such cellular devices may include a router and modem to be integrated as a single entity and antenna to be another entity. The modem within the router may be in communication with the antenna to receive the signals from the cell towers. Usually, the antenna may be placed at outdoors, for being able to receive the cellular signals. The modem and the router may be placed indoors in proximity to the user devices which require Internet access. The antenna, placed outdoors, may be connected with the modem and the router, placed indoors, via a cable. The cable transmits the cellular signals from the antenna to the modem. But with such an arrangement, it is possible that there may be loss in the signals when transmitting from the antenna to a remotely placed modem. Such losses may lead to a decrease in strength and quality of the signals. Further, in such scenarios, if the cellular device is located remotely from the cell tower, obtaining a high speed internet connection may be a challenge to a user.

An example prior art document, PCT application number PCT/EP2014/078311 titled "Indoor Distribution of A Broadband Signal," discloses a system and a method for distribution of a broadband signal of a mobile radio communication network to at least one subscriber device located in an indoor environment. The proposed system of the prior art includes an outdoor module which is configured to receive broadband signals, extract signals from the data stream, encapsulate the data stream into Ethernet data frames and use the Ethernet data frames for modulating at least one carrier signal adapted for being transmitted over a link of the indoor environment together with a further signal. Further, the proposed system includes an indoor module connected to said outdoor module via said link. The indoor module is configured to separate said at least one received modulated carrier signal and the received further signal, extract from the at least one received modulated carrier signal the Ethernet data frames and make them available to at least one subscriber device.

Similarly, another prior art document, PCT application number PCT/EP2016/075976, titled "A Multi-Network Telematics Device With Multiple Antennas," discloses a telematics device which includes an antenna unit with a plurality of antennas mounted on a substrate, an electronic control circuit on a substrate and a housing enclosing and supporting the antenna substrate and the control circuit substrate in a multi-tier arrangement. The housing includes an RF transparent cover and a base. The antennas are supported in a manner exposed to the housing cover, and the control circuit substrate is spaced apart from the antenna substrate on a side opposed to the housing cover.

However, some of the systems of the prior arts teach to place the cellular device in the outdoor, to provide internet access to user devices present in the indoor. In such cases, it may lay a constraint that the user devices need to be in proximity to the cellular device, which is placed outdoor, to obtain the internet access. Other prior art references include antennas to be in proximity with a control circuit to lessen the loss in transmission of signals. Also, some of the proposed systems of the prior art references mention use of single subscriber to the cellular data. Thus, in case there is trouble in communicating with the cell tower of the subscriber, the system may not function or may fail to provide the internet access to the user devices. Further, the outdoor module of the prior art is an integrated structure without any flexibility to change as per the requirements of the user. There is no provision to change the antenna or modem in the prior system. Thus, system of the prior art is unadaptable and restricted to function in a single manner.

Therefore, there is a need for a system that is less complex, easily installable, very adaptable and efficient in providing internet to multiple user devices.

SUMMARY

System, device and non-transitory computer readable medium are described for providing internet to one or more user devices. The system includes an exterior unit and a router unit. The exterior unit is placed in an open environment and the router unit is placed in proximity to the one or more user devices. The exterior unit includes a detachable cellular modem and an antenna and modem housing arrangement. The detachable cellular modem is configured to receive signals from one or more antennas via a first interface and transmit data to the router unit via a second interface. The detachable cellular modem includes a modem housing to accommodate a Subscriber Identity Module (SIM) slot unit with plurality of SIM slots. The SIM slot unit is interconnected with one or more connectors to enable connectivity via the first interface and the second interface. The antenna and modem housing arrangement includes an antenna arrangement to accommodate the one or more antennas at slant polarization (e.g., 45 degrees), and a modem holding housing to accommodate the detachable cellular modem. The router unit is connectable with the one or more user devices for providing internet to the one or more user devices.

According to an embodiment, the system further includes an application configured to receive one or more inputs from at least one user associated with the one or more user devices. Further, based on the one or more inputs, one or more actions are performed. The one or more actions includes at least one of selecting one of plurality of SIMs, inserted in the plurality of SIM slots, to be internet provider for the one or more user devices, checking speed of internet provided by the internet provider and displaying information related to cell towers associated with internet providers of each the plurality of SIMs.

According to an embodiment, the antenna and modem housing arrangement further includes a detachable modem locking and sealing mechanism designed to be fitted to the modem holding housing, to hold the detachable cellular modem within the modem holding housing.

According to an embodiment, the system further includes a mounting pole to enable mounting of the exterior unit at a predefined distance from a surface in the open environment.

According to an embodiment, the antenna arrangement is designed to be one of angel wing antenna and binocular antenna.

According to an embodiment, the one or more connectors include a Multiple In Multiple Out (MIMO) antenna connector for establishing connection via the first interface for transmission of the signals from the one or more antennas to the detachable cellular modem, wherein the detachable cellular modem converts the signals from the one or more antennas to the data to be transmitted to the router unit. The MIMO connector is one of 2×2 MIMO connector and 4×4 MIMO connector.

According to an embodiment, the one or more connectors include a Universal Serial Bus (USB) connector for establishing connection via the second interface for transmission of the data from the detachable cellular modem to the router unit.

According to an embodiment, the router unit supports at least one of 802.11ac Wireless (Wi)-Fidelity (Fi) Access Point (AP) with one of 2.4 GHz radio band and 5 GHz radio band, and ethernet connection.

According to an embodiment, the exterior unit is mounted on an outside surface of a recreational vehicle and the router unit is placed within interior of the recreational vehicle.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

Referring to the Figures.

DETAILED DESCRIPTION

Figure 1A:
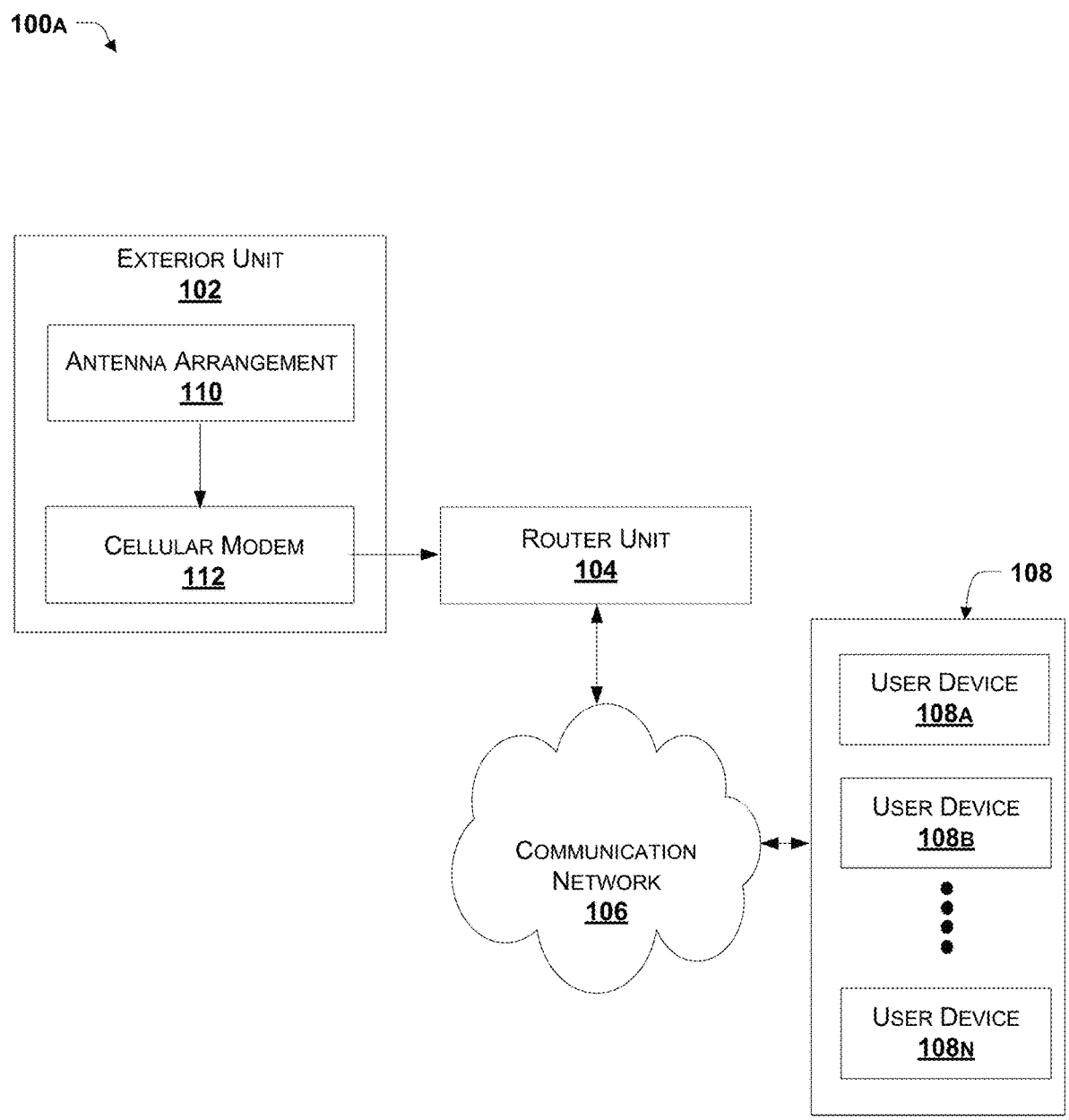
FIGS. 1A and 1B illustrate exemplary environments with system for providing internet to one or more user devices, in accordance with an embodiment of the present disclosure.

Present disclosure relates to a system for providing internet to one or more user devices. The system is designed to provide high speed internet using cellular networks. The system includes an exterior unit which is placed in an open environment and a router unit which is placed in proximity to the one or more user devices. The exterior unit includes the detachable cellular modem and an antenna and modem housing arrangement. The detachable cellular modem includes a SIM slot unit to accommodate plurality of SIMS, and one or more connectors. The antenna and modem housing arrangement includes an antenna arrangement to accommodate the one or more antennas at slant polarization, and a modem holding housing to accommodate the detachable cellular modem.

The system is designed such that the detachable cellular modem is part of the exterior unit along with the one or more antennas, and not part of the router unit. Thus, loss less transmission for antenna signals to the detachable cellular modem may be achieved. Further, the antenna arrangement, with the one or more antennas at slant polarization, enhances strength of signals captured by the system. Further, the cellular modem is configured to be detachable from the antenna and modem housing arrangement. User is provisioned to change the cellular modem or the antenna arrangement based on desired application. For example, a cellular modem supporting 4G ($4^{th}$ Generation) communication may be replaced with a cellular modem supporting 5G ($5^{th}$ Generation) communication. In other case, an omni-directional antenna may be replaced with a unidirectional antenna or vice versa based on location of cell towers. Also, the present disclosure provisions an option to user to select cell tower which can provide stronger signals. Due to such adaptability, the proposed system displays a significant advantage of providing high speed internet to the user even when using the system in remote areas or when the system is mobile.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form to avoid obscuring the concepts of the presently disclosed method and system.

Embodiments of the present invention include various steps, which will be described below. The steps may be performed by hardware components or may be embodied in machine-executable instructions, which may be used to cause a general-purpose or special-purpose processor programmed with the instructions to perform the steps.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "target output" generally refers to various forms of data, information, services, applications, and/or hardware devices that may be accessed via a network (e.g., the Internet). Non-limiting examples of target output include web applications, cloud-based services, network devices, and/or associated applications (e.g., user interface applications), and network security devices and/or associated applications (e.g., user interface applications). Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

FIG. 1A illustrates exemplary environment 100A with system for providing internet to one or more user devices, in accordance with an embodiment of the present disclosure. The exemplary environment 100A includes a system 102, a communication network 110 and one or more user devices 108A-108N (herewith collectively referred to as one or more user devices 108). System 102 may communicate with one or more user devices 108 via communication network 110. Communication established between system 102 and each of one or more user devices 108 may be one of wired communication and wireless communication. In an embodiment, communication network 110 may include, without limitation, a direct interconnection, a Local Area Network (LAN), a Wide Area Network (WAN), a wireless network (e.g., using Wireless Application Protocol), the Internet, and the like. In an embodiment, communication network 110 may support, without limitation, communication based on 3G ($3^{rd}$ Generation), 4G, 5G and so on.

One or more user devices 108 may be possess an ability to access internet provided by system 102. One or more user devices 108 may include, but are not limited to, a laptop computer, a desktop computer, a Personal Computer (PC), a notebook, a smartphone, a tablet, e-book readers, a server, a network server, a cloud server, and the like.

System 102 is configured to provide internet to one or more user devices 108 using cellular network. As shown in FIG. 1A, system 102 includes an exterior unit 104 and a router unit 106. In exemplary environment 1003 shown in FIG. 13, exterior unit 104 includes an antenna and modem housing arrangement 112 and a cellular modem 114 (herewith, may also be referred to as a detachable cellular modem 114). Detachable cellular modem 114 may be detachable from exterior unit 104. Detachable cellular modem 114 is configured to receive signals from one or more antennas via a first interface. The received signals are converted to data that are transmitted to router unit 106. Detachable cellular modem 114 may transmit data to router unit 106 of system 102 via a second interface. Detachable cellular modem 114 includes a modem housing to accommodate a SIM slot unit 120 with plurality of SIM slots. SIM slot unit 120 is interconnected with one or more connectors to enable connectivity via the first interface and the second interface. In an embodiment, SIM slot unit 120 may be coupled with an expansion board to enable accommodation of plurality of SIMs. In a non-limiting embodiment, the expansion board may be a M2 board. In an embodiment, for a 4G connection via LTE-FDD, the detachable cellular modem 114 is connectable to at least one band selected from plurality of bands comprising B1, B2, B3, B4, B5, B7, B8, B9, B12, B13, B14, B17, B18, B19, B20, B21, B25, B26, B28, B29, B30, B32, B71 and B66. In an embodiment, for a 4G connection via LTE-TDD, detachable cellular modem 114 is connectable to at least one band selected from plurality of bands comprising B38, B39, B40, B41. In an embodiment, for a 5G connection via 5G NR 3GPP Release NSA and SA operation, detachable cellular modem 114 is connectable to at least one band selected from plurality of bands comprising n1, n2, n3, n5, n7, n8, n12, n20, n25, n28, n38, n40, n41, n48*, n66, n71, n77, n78 and n79.

The plurality of SIMs that may be inserted in cellular modem 114 may be the ones that are issued by local service providers. In an embodiment, cellular modem 114 may include two or more SIM slots to accommodate two or more SIMs. In an embodiment, SIM slot unit 120 may include two SIM slots to include two active SIMs. In an embodiment, at least one active SIM is to be included in SIM slot unit 120, to enable the data transfer to one or more user devices 108.

In an embodiment, one or more connectors include Multiple In Multiple Out (MIMO) antenna connector 116 for establishing connection via the first interface for transmission of the signals from one or more antennas to detachable cellular modem 114. In an embodiment, MIMO connector 116 may be one of 2×2 MIMO connector and 4×4 MIMO connector. Detachable cellular modem 114 converts the signals from the one or more antennas to the data that is to be transmitted to router unit 106. Further, the one or more connectors may include Universal Serial Bus (USB) connector 118 for establishing connection via the second interface for transmission of the data from detachable cellular modem 114 to router unit 106. In an embodiment, USB connector 118 may selected to be one of USB Type-A or USB Type-C connector.

Figure 2:
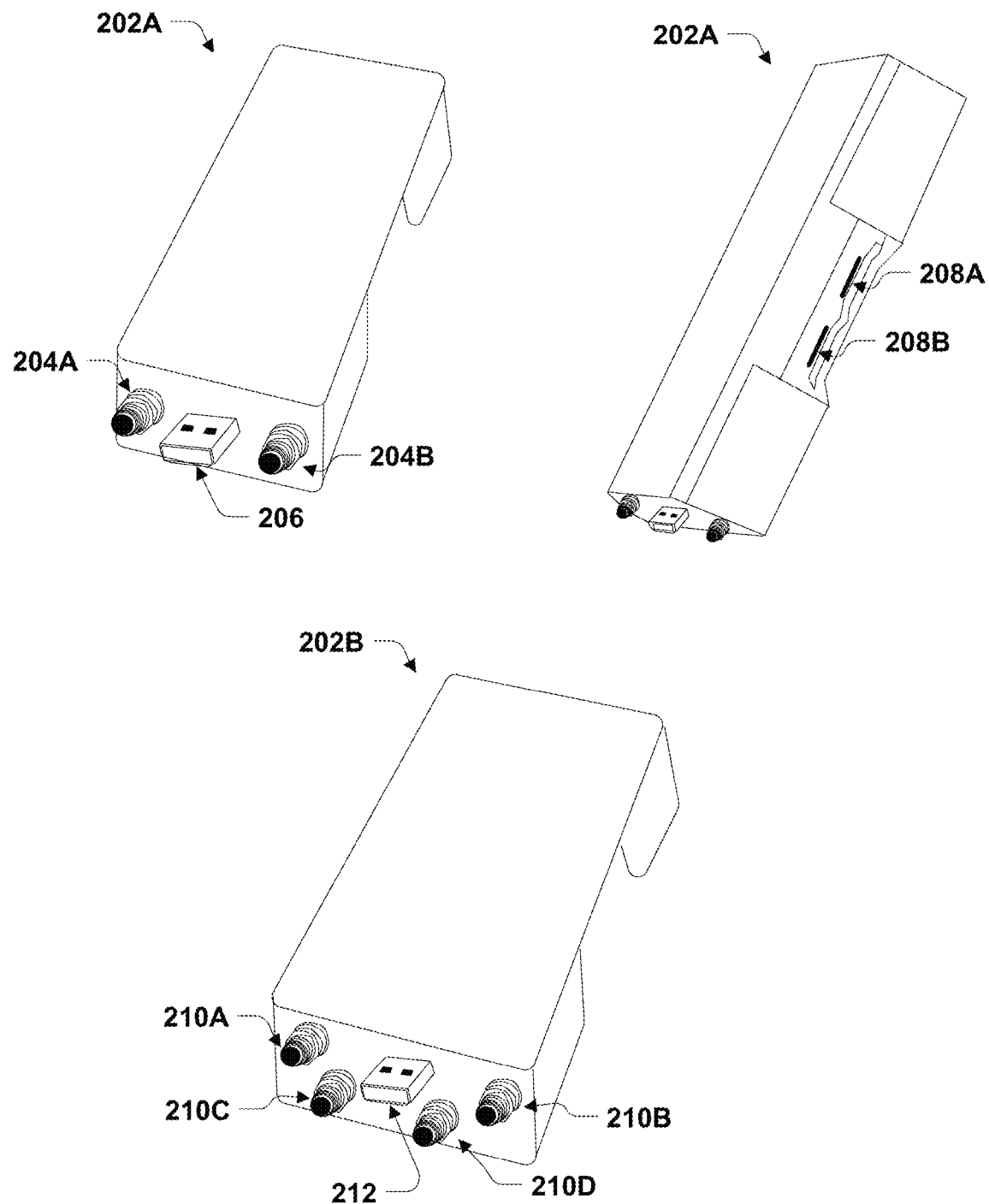
FIG. 2 shows exemplary representation of detachable cellular modem of system, in accordance with an embodiment of the present disclosure.

FIG. 2 shows exemplary representation of the detachable cellular modem, in accordance with an embodiment of the present disclosure. Consider a cellular modem 202A as shown in FIG. 2. Cellular modem 202A includes a housing to accommodate the SIM slot unit with SIM slots 208A and 208B. In a non-limiting embodiment, cellular modem 114 may include multiple SIM slots to accommodate more than two SIMs. Cellular modem 202A is built using a 2×2 MIMO antenna connector with MIMO ports 204A and 204B, and a USB connector with USB port 206. In an embodiment, cellular modem 202A with 2×2 MIMO connector may be able to support 3G and 4G based communication. Consider a cellular modem 202B as shown in FIG. 2. Cellular modem 202B is built using a 4×4 MIMO antenna connector with MIMO ports 210A, 210B, 210C and 210D, and a USB connector with USB port 212. In an embodiment, cellular modem 202B with 4×4 MIMO connector may be able to support 3G, 4G and 5G based communication.

Further, antenna and modem housing arrangement 112 of exterior unit 104 include an antenna arrangement and a modem holding housing. The antenna arrangement accommodates the one or more antennas at slant polarization. In an embodiment, the one or more antennas may be accommodated as 45° polarization. In another embodiment, the one or more antennas may be accommodated as 37° polarization. In an embodiment, the antenna arrangement may be designed to be one of angel wing antenna and binocular antenna. The angel wing antenna may function as an omni-directional antenna. The binocular antenna may function as unidirectional antenna. The modem holding housing accommodates detachable cellular modem 114. In an embodiment, system 102 may further include a mounting pole to enable mounting of exterior unit 104 at a predefined distance from a surface in the open environment. In the given example, the mounting pole may be used to mount exterior unit 104 on top surface of the recreational vehicle. Exterior unit 104 may be placed at a height of 3-feet to 7-feet, for better signal strength and quality.

Figure 3A:
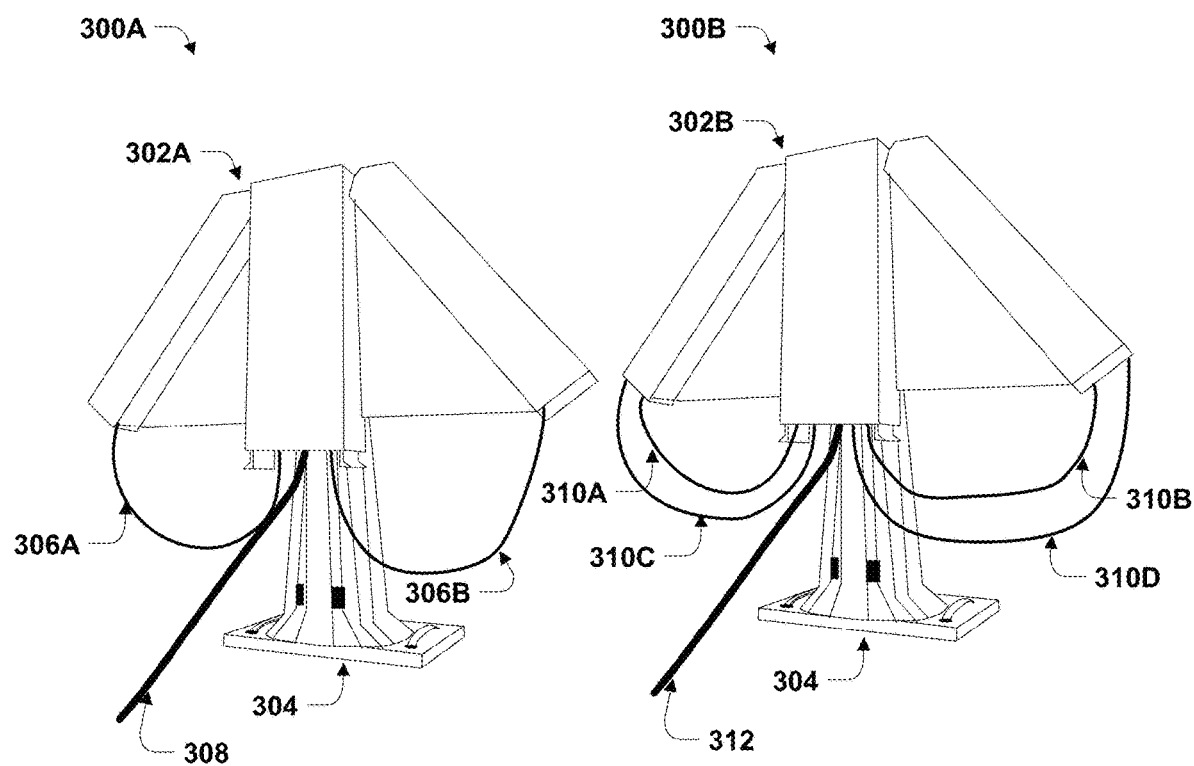
FIG. 3A shows exemplary representation of exterior unit with angel wing antenna, in accordance with an embodiment of the present disclosure.

FIG. 3A shows exemplary representation of exterior unit 104, in accordance with an embodiment of the present disclosure. Exterior unit 300A includes an antenna and modem housing arrangement 302A. Antenna and modem housing arrangement 302A includes the modem holding housing which accommodates cellular modem 114 with 2×2 MIMO connector and a USB connector. Further, antenna and modem housing arrangement 302A includes the antenna arrangement to be the angel wing antenna. The antenna arrangement with the angel wing antenna is an omni-directional antenna. Such antenna may be placed in any direction, irrespective of direction of cell tower, to catch cellular signals. The first interface between cellular modem 114 and the one or more antennas may be achieved using cables 306A and 306B. Cables 306A and 306B are used for enabling 2×2 MIMO based communication between the one or more antennas and cellular modem 114. Cellular signals received by the one or more antennas are communicated to cellular modem 114 via cables 306A and 306B. The second interface between cellular modem 114 and router unit 106 may be achieved using cable 308. Cable 308 enables USB based communication between router unit 106 and cellular modem 114. The cellular signals received from the one or more antennas are modulated by cellular modem 114 to output data. Such data is transmitted to router unit 106 using cable 308.

Exterior unit 300A is attaches to mounting pole 304. In an embodiment, antenna and modem housing arrangement 112 may be designed to be hooked with the mounting pole. In an embodiment, antenna and modem housing arrangement 112 may be designed to be retrofitted with the mounting pole. One or more techniques known to a person skilled in the art, may be used to attach antenna and modem housing arrangement 112 with the mounting pole. The structure of the mounting pole shown in the figures is an exemplary representation. The mounting pole may be of any structure to support mounting of the exterior unit 104 on a surface in an open environment. In an embodiment, exterior unit 104 along with the mounting pole may be mounted on the surface in the open environment.

Figure 3B:
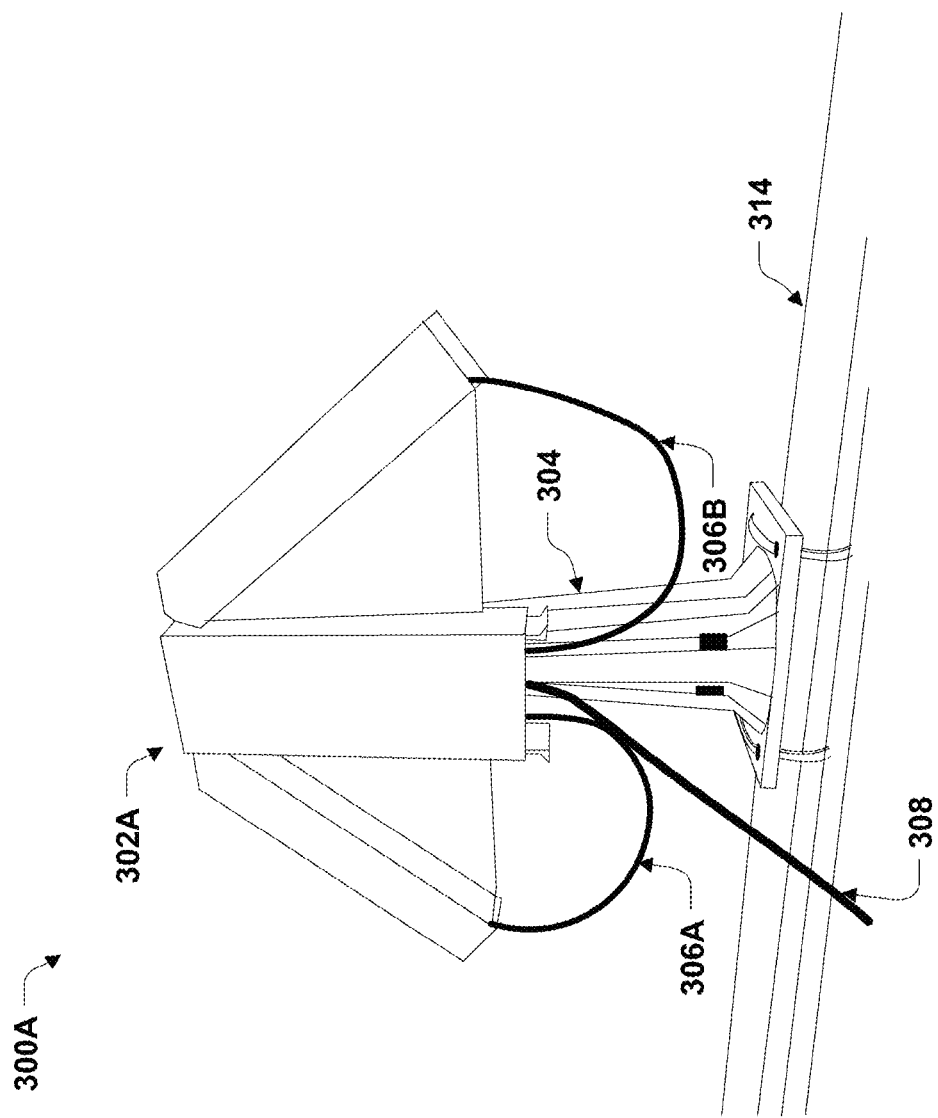
FIG. 3B shows exemplary representation of exterior unit mounted on a surface using a mounting pole, in accordance with an embodiment of the present disclosure.

Consider exterior unit 300A shown in FIG. 3B. FIG. 3B shows an exemplary representation of the exterior unit 300A mounted on surface 314 using mounting pole 304, in accordance with an embodiment of the present disclosure. In an embodiment, the surface may be a top roof of a recreational vehicle. In another embodiment, the surface may be rooftop of a house or a building. In an embodiment, the surface may be any place which can accommodate exterior unit 300A and the mounting pole in an open environment. In an alternate embodiment, exterior unit 300A may be designed to me directly mounted on the surface, without a need of the mounting pole. In an embodiment, the mounting pole may be used to place exterior unit 300A at the predefined distance from the surface. The predefined distance may be selected such that the one or more antennas can catch the cellular signals from cell towers. In an embodiment, exterior unit 300A may be directly mounted on the surface, excluding mounting pole 304. In such embodiment, exterior unit 300A may be structured to enable fixing of exterior unit 300A on the surface, using one or more mechanisms known to a person skilled in the art.

Referring back to FIG. 3A, exterior unit 300A represents another embodiment with an antenna and modem housing arrangement 302B. The antenna and modem housing arrangement 302B includes the modem holding housing which accommodates cellular modem 114 with 4×4 MIMO connector and a USB connector. Further, antenna and modem housing arrangement 302B includes the antenna arrangement to be the angel wing antenna. The first interface between cellular modem 114 and the one or more antennas may be achieved using cables 310A, 310B, 310C and 310D. Cables 310A, 310B, 310C and 310D enable 4×4 MIMO based communication between the one or more antennas and cellular modem 114. Cellular signals received by the one or more antennas are communicated to cellular modem 114 via cables 310A, 310B, 310C and 310D. The second interface between the cellular modem 114 and the router unit 106 may use cable 312. Cable 312 enables USB-based communication between router unit 106 and cellular modem 114. The data from cellular modem 114 is transmitted to router unit 106 using cable 312. Exterior unit 300B attaches to mounting pole 304.

Figure 3C:
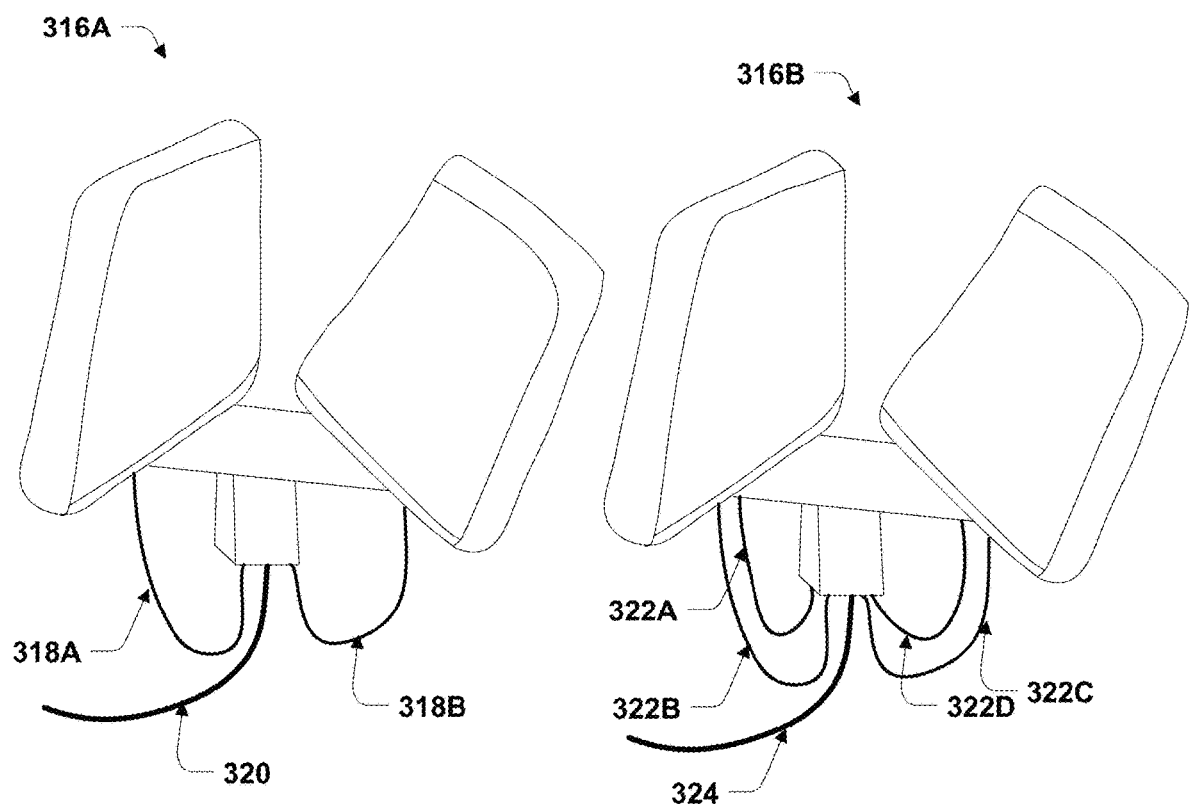
FIG. 3C shows exemplary representation of exterior unit with binocular antenna, in accordance with an embodiment of the present disclosure.

FIG. 3C shows exemplary representations of the exterior units 316A and 316B with binocular antenna, in accordance with an embodiment of the present disclosure. Exterior unit 316A includes an antenna and modem housing arrangement to be the binocular antenna. The antenna arrangement with the binocular antenna is unidirectional antenna. Such antenna needs to be placed facing towards direction of the cell tower, to catch cellular signals. The antenna and modem housing arrangement of exterior unit 316A includes the modem holding housing which accommodates cellular modem 114 with 2×2 MIMO connector and a USB connector. The first interface between cellular modem 114 and the one or more antennas may be achieved using cables 318A and 318B. Cables 318A and 318B are used for enabling 2×2 MIMO based communication between the one or more antennas and cellular modem 114. The second interface between cellular modem 114 and router unit 106 may be achieved using cable 320. In another embodiment, exterior unit 316B, as shown in FIG. 3C, may be implemented in system 102. The antenna and modem housing arrangement of exterior unit 316B includes the modem holding housing which accommodates cellular modem 114 with 4×4 MIMO connector and a USB connector. The first interface between cellular modem 114 and the one or more antennas may be achieved using cables 322A, 322B, 322C and 322D. The cables 322A, 322B, 322C and 322D enables 4×4 MIMO based communication between the one or more antennas and cellular modem 114. The second interface between cellular modem 114 and router unit 106 may be achieved using cable 324. Cable 324 enables USB-based communication between router unit 106 and cellular modem 114. The data from cellular modem 114 is transmitted to router unit 106 using cable 324. In a non-limiting embodiment, connectivity of the first interface and the second interface may be achieved using any communication network that is known to a person skilled in the art. Such communication network need to provision lossless communication of signals and data between the one or more antennas, cellular modem 114 and router unit 106.

Figure 3D:
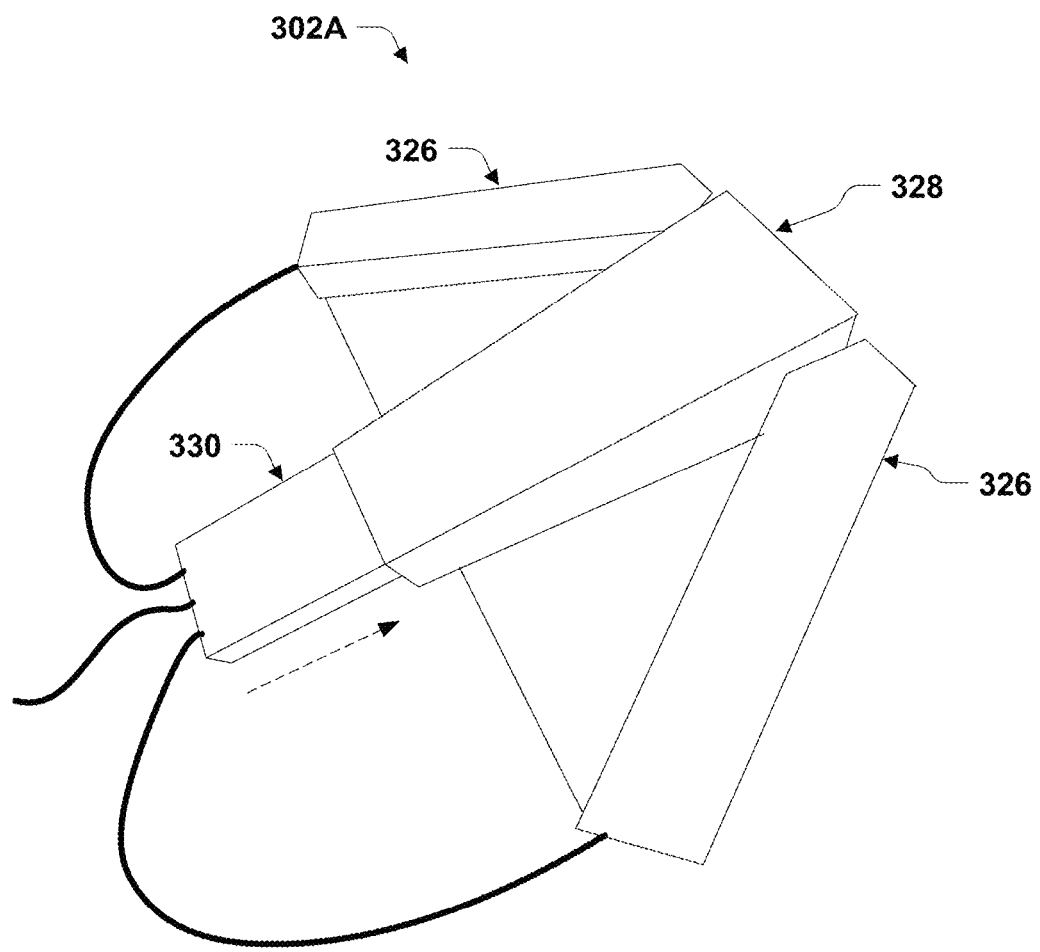
FIGS. 3D and 3E show exemplary representations of an antenna and modem housing arrangement, in accordance with an embodiment of the present disclosure.

FIG. 3D shows exemplary representation of antenna and modem housing arrangement 302A, in accordance with an embodiment of the present disclosure. Antenna and modem housing arrangement 302A includes antenna arrangement 326 and modem holding housing 328. Antenna arrangement 326 shown in FIG. 3D is the angel wing antenna with the one or more antennas at 45° polarization. In an embodiment, antenna arrangement 326 may include two rectangular housings placed at opposite sides with 45° inclination from to vertical axis of antenna and modem housing arrangement 302A. Modem holding housing 328 may be placed in between the two rectangular housing as shown in FIG. 3D. The modem holding housing may also be a rectangular housing with a hollow space, to accommodate cellular modem 330. Cellular modem 330 may be accommodated in the hollow space of modem holding housing 328 as shown in FIG. 3D.

Figure 3E:
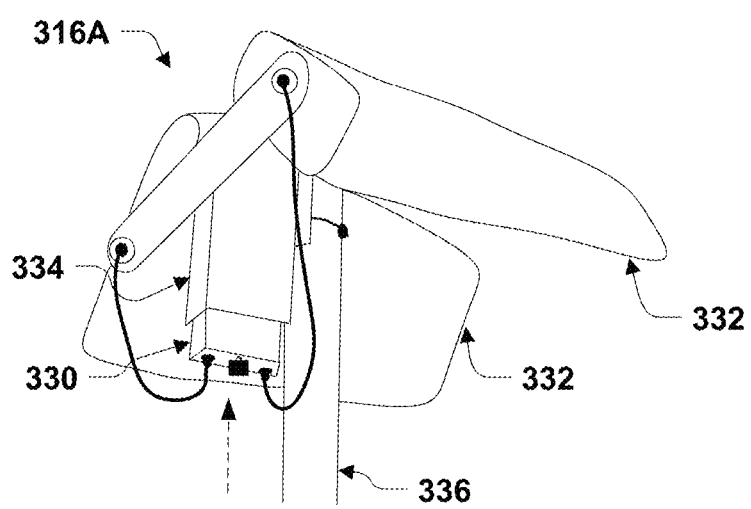

FIG. 3E shows another exemplary representation of antenna and modem housing arrangement 316A, in accordance with an embodiment of the present disclosure. Antenna and modem housing arrangement 316A mounta to mounting pole 336. Antenna and modem housing arrangement 316A includes antenna arrangement 332 and modem holding housing 334. Antenna arrangement 332 shown in FIG. 3E is the binocular antenna with the one or more antennas at 45° polarization. In an embodiment, antenna arrangement 332 may include two rectangular housings with curved edges and vertices. Each of the two rectangular housings includes two end sides. One of the two end sides may be flat and other end side may be curved. Flat end sides of the two rectangular housings are retrofitted on ends of a rod. Further, from center of the rod, along vertical axis of antenna and modem housing arrangement 316A, modem holding housing 334 may be fixed to accommodate cellular modem 330. Modem holding housing 334 may be a rectangular housing with a hollow space. Cellular modem 330 may be accommodated in the hollow space of modem holding housing 334 as shown in FIG. 3E.

Figure 4:
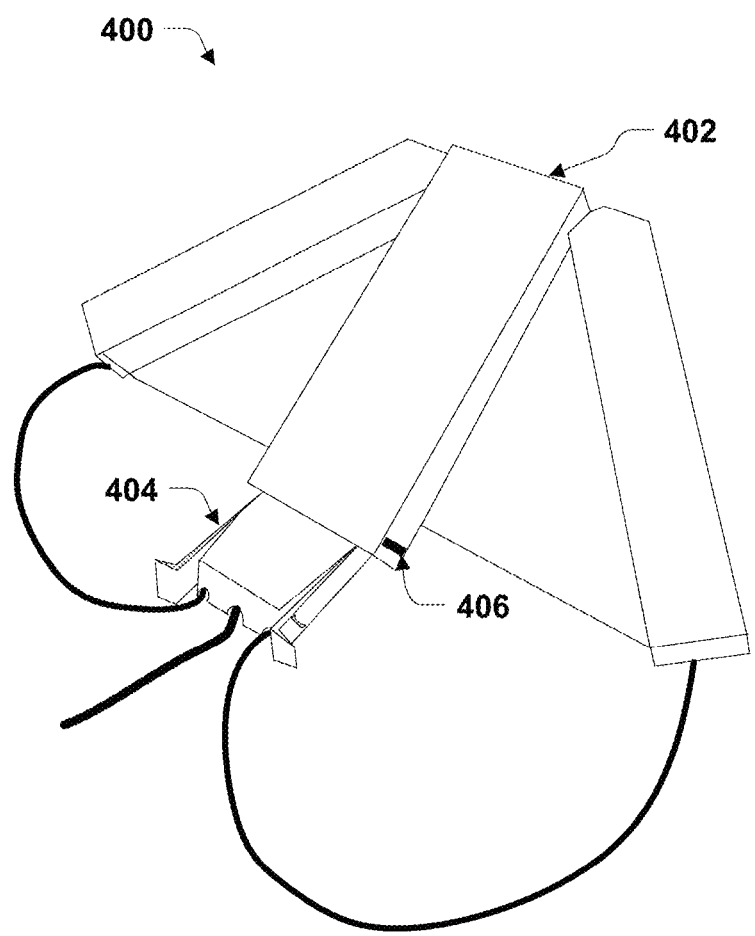
FIG. 4 shows exemplary representation of a detachable modem locking and sealing mechanism in system, in accordance with an embodiment of the present disclosure.

In an embodiment, antenna and modem housing arrangement 112 further includes a detachable modem locking and sealing mechanism designed to be fitted to the modem holding housing, to hold the detachable cellular modem 114. Since, exterior unit 104 is placed in an open environment, there is a need to safeguard cellular modem 114 that is placed inside the modem holding housing. FIG. 4 shows exemplary representation 400 of the detachable modem locking and sealing mechanism, in accordance with an embodiment of the present disclosure. The detachable modem locking and sealing mechanism may include snap fitting component 404 which is designed to fit into the hollow space of modem holding housing 402 upon accommodating cellular modem 114. Snap fitting component 404 may snap fit itself with side surfaces of the modem holding housing 402. As shown in FIG. 4, the side surfaces of modem holding housing 402 may include opening to enable the fitting of the snap fitting component 404. Also, snap fitting component 404 may include holes 406 to accommodate plurality of cables from cellular modem 114. Thus, by using such snap fitting component 404, the cellular modem 114 may be securely placed and sealed within the hollow space of the modem holding housing 402. Further, such mechanism may also be easily removed. The removal process may include pressing onto protrusions of snap fitting component 404 and pulling out snap fitting component 404 from the hollow space. By pressing onto the protrusion, the snap fitting with the side surface may be disengaged and snap fitting component 404 may be easily removed form the hollow space. In another embodiment, the detachable modem locking and sealing mechanism may include a cap with dimension equivalent to dimensions of opening of the hollow space (not shown in Figures). The cap may be pushed into the hollow space through the opening to achieve locking and sealing of modem holding housing 402. The cap may also include a protrusion to enable a user to detach the cap from modem holding housing 402. One or more other mechanisms, known to a person skilled in the art, may be implemented in system 102 as the locking and sealing mechanism to achieve the locking and the sealing of cellular modem 114 within modem holding housing 402.

In a preferably embodiment, exterior unit 104 is placed in the open environment and router unit 106 may be placed in proximity with the one or more user devices 108. For example, consider system 102 is implemented in a recreational vehicle. Exterior unit 104 may be mounted on top surface of the recreational vehicle in open space. Router unit 106 may be placed in interior of the recreational vehicle. Exterior unit 104, to connect with router unit 106, needs to include cellular modem 114 connected to the one or more antennas. Further, cellular modem 114 needs to include at least one connector to enable connectivity using the second interface with router unit 106. Such connector may be a USB port and a USB cable.

Figure 1B:
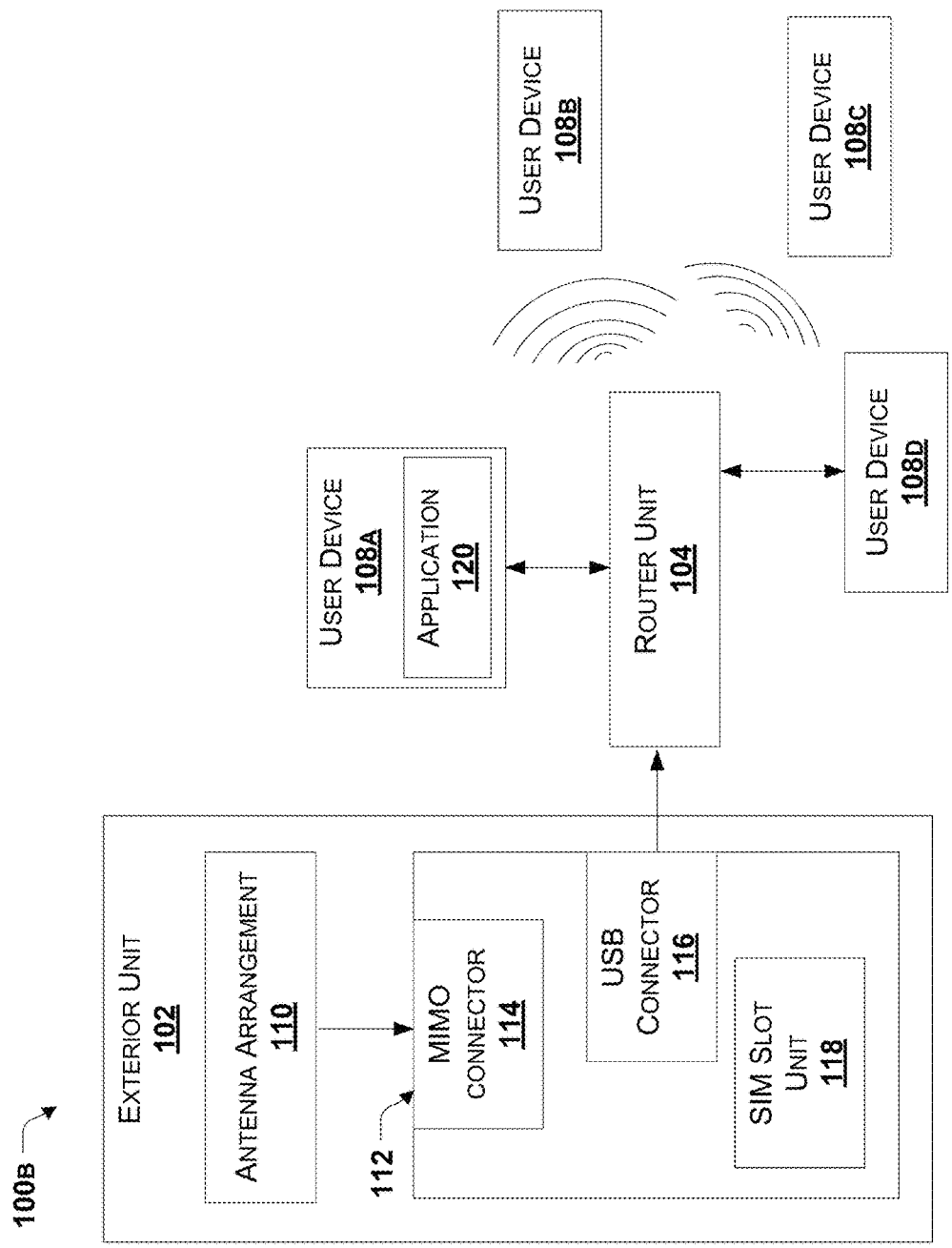
Figure 5:
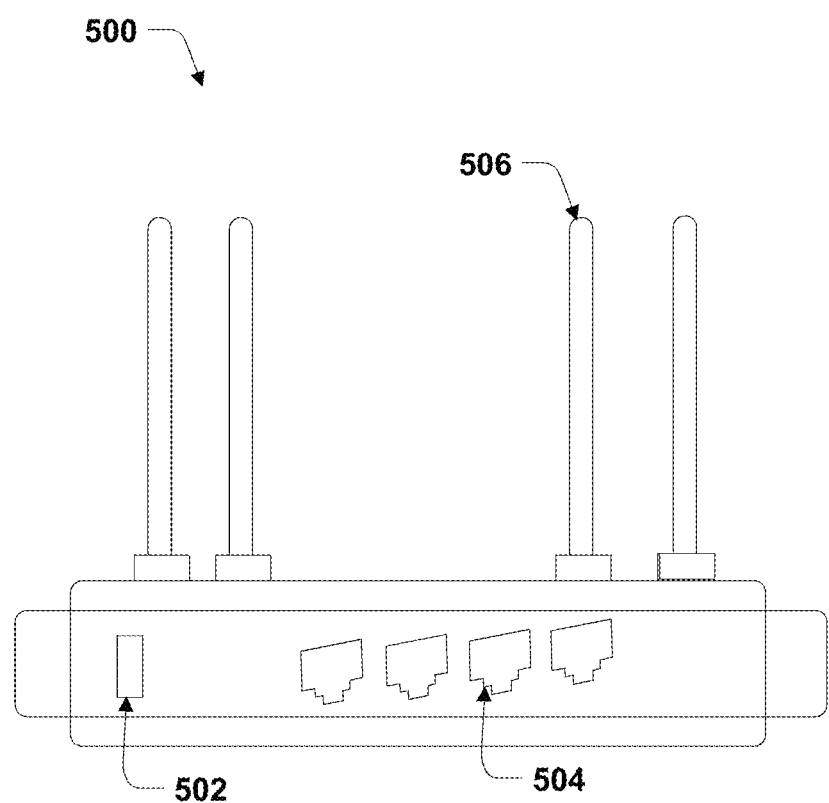
FIG. 5 shows exemplary representation of a router unit of system, in accordance with an embodiment of the present disclosure.

Router unit 106 of system 102 may be configured to receive the data from cellular modem 114 using the second interface. Router unit 106 is connectable with one or more user devices 108 for providing internet to one or more user devices 108. FIG. 5 shows exemplary representation of router unit 500 of the system 102, in accordance with an embodiment of the present disclosure. In an embodiment, router unit 500 may be a standard Wi-Fi router with capability of connecting with cellular modem 114 and providing internet to the one or more user devices 108. In an embodiment, router unit 500 may support at least one of wireless connection and wired connection with one or more user devices 108. In an embodiment, the wireless connection may be achieved via 802.11ac Wireless Wi-Fi Access Point (AP) with one of 2.4 GHz radio band and 5 GHz radio band. In an embodiment, the wired connection may be achieved via ethernet connection. In an embodiment, router unit 500 may include plurality of ports and plurality of antennas units 506 to enable communication with cellular modem 114 and one or more user devices 108. The plurality of ports include USB port 502 and ethernet ports 504. In an embodiment, cellular modem 114 may be connected with router unit 500 using the USB cable connected to USB port 502. Further, referring back to FIG. 1B, consider one or more user devices 108 include user device 108A, user device 108B, user device 108C, and user device 108D. User devices 108A-108D may be connected to router unit 500 (same as router 106) to access the internet provided by system 102. User device 108A and 108D may be connected via ethernet cables. User device 108B and 108C may be connected wirelessly to router unit 500 using Wi-Fi through plurality of antenna units 506.

Figure 6:
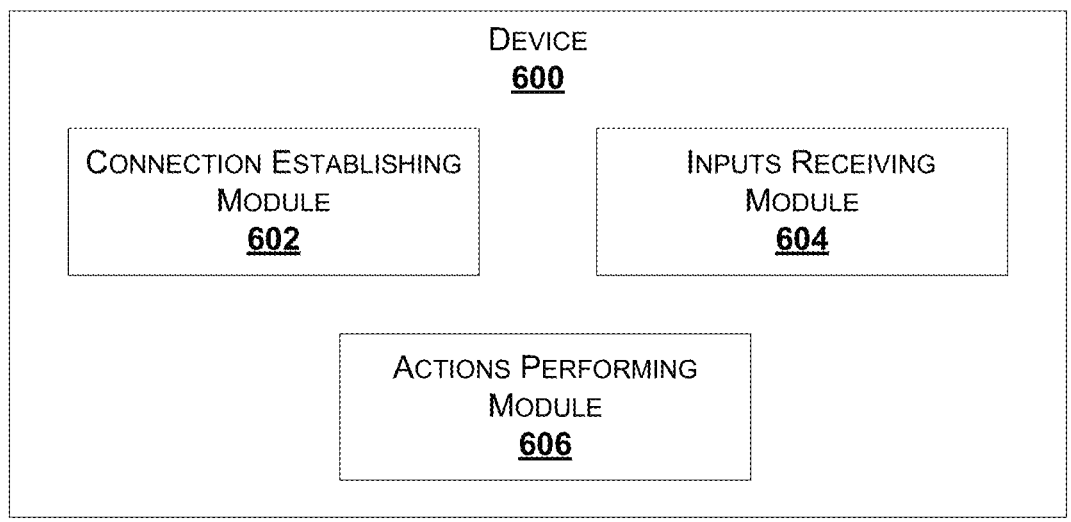
FIG. 6 illustrates functional sub-modules of a device, in accordance with an embodiment of the present disclosure.

Further, system 102 includes an application. The application may be a software application installed in a device from one or more user devices 108. FIG. 6 illustrates functional sub-modules of device 600 with the application, in accordance with an embodiment of the present disclosure. In an embodiment, device 600 may include one or more processors, an Input/Output (I/O) interface, a memory (not shown in Figures) and sub-modules. In some non-limiting embodiments or aspects, the memory may be communicatively coupled to the one or more processors. The memory stores instructions, executable by the one or more processors, which on execution, may cause device 600 to run the application of system 102 as described in the present disclosure. In some non-limiting embodiments or aspects, the memory may include data required for running the application. The sub-modules may be configured to perform the steps of the present disclosure using the data in the memory. In some non-limiting embodiments or aspects, each of the sub-modules may be a hardware unit coupled with device 600. In some non-limiting embodiments or aspects, device 600 may be a variety of computing systems, such as a laptop computer, a desktop computer, a Personal Computer (PC), a notebook, a smartphone, a tablet, e-book readers, a server, a network server, a cloud server, and the like.

The sub-modules are described herein in detail. In one implementation, the sub-modules may include, but is not limited to, connection establishing module 602, inputs receiving module 604, and actions performing module 606. In some non-limiting embodiments or aspects, the data in the memory may be processed by the sub-modules of device 600. In some non-limiting embodiments or aspects, the sub-modules may be implemented as dedicated units and when implemented in such a manner, the modules may be configured with the functionality defined in the present disclosure to result in a novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The sub-modules of the present disclosure function to run the application. The sub-modules may be implemented in any device for running the application in such device.

Connection establishing module 602 may be configured to establish connection with router unit 106. In an embodiment, by establishing the connection, device 600 may be provided with access to the internet. Further, other data related to at least one of router unit 106, cellular modem 114, the one or more antennas and details of the cell towers associated with the plurality of SIMs inserted in cellular modem 114, may be communicated with device 600, using the connection established.

Inputs receiving module 604 may be configured to receive one or more inputs provided by a user using the application. Using the application in device 600, the user of device 600 may be provided with at least one option to receive the one or more inputs. Further, based on the one or more inputs, actions performing module 606 may be configured to perform one or more actions. In an embodiment, the one or more actions may include, but is not limited to, at least one of selecting one of plurality of SIMs, inserted in the plurality of SIM slots, to be internet provider for one or more user devices 108, checking speed of internet provided by the internet provider and displaying information related to cell towers associated with internet providers of each the plurality of SIMs.

Figure 7:
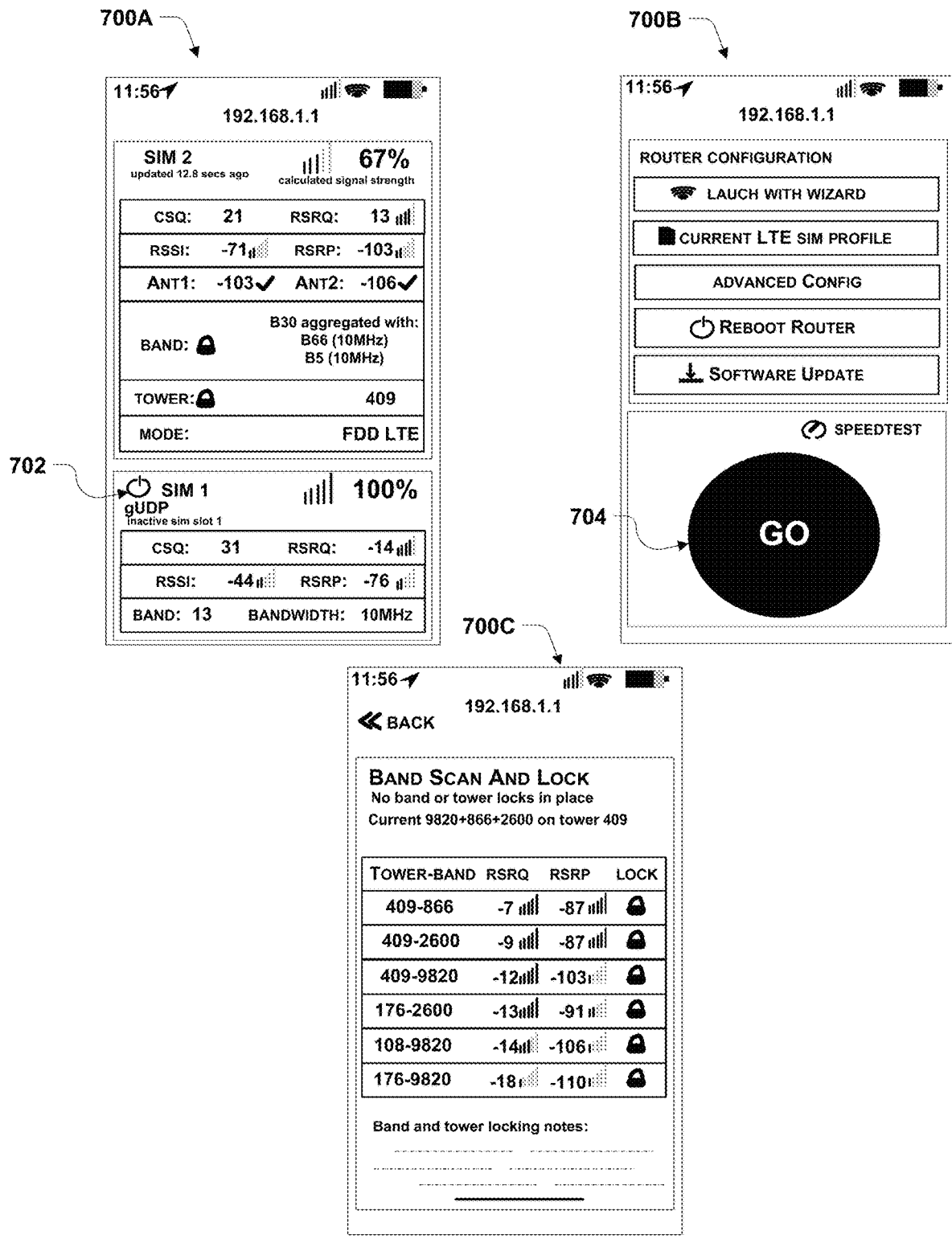
FIG. 7 shows exemplary representation of Graphical User Interfaces (GUIs) displayed on the disclosed device, in accordance with an embodiment of the present disclosure.

FIG. 7 shows exemplary representation of Graphical User Interfaces (GUIs) 700A, 700B and 700C displayed on the device, in accordance with an embodiment of the present disclosure. GUIs 700A, 700B and 700C may provide the at least one option in form of icons. The user may select the icons to provide the one or more inputs. Consider GUI 700A. The GUI 700A display details and status of SIM 1 and SIM 2 inserted in cellular modem 114. The details of a SIM may include band details, tower details, bandwidth details, connection mode details, Cell Signal Quality (CSQ), Received Signal Strength Indicator (RRSI), Reference Signal Received Power (RSRP), Reference Signal Received Quality (RSRQ), Antenna configurations (ANT1 and ANT2) and so on. Status of a SIM may indicate if the SIM is an active SIM or inactive SIM. The status may be inactive when the SIM is not used for internet access. The status may be active when the SIM is used for the internet access. In GUI 700A, SIM 2 is the active SIM and SIM 1 is the inactive SIM. The user may select icon 702, to switch from SIM 2 to SIM 1. The user may opt to switch from SIM 2 to SIM 1, since signal strength of SIM 1 is greater than that of SIM 2. One or more algorithms, known to a person skilled in the art, may be implemented in the application to determine the details and status of the SIMs.

Further, as shown in GUI 700B, the application may provide other options relating to router unit 106. Such options may include, but is not limited to, rebooting of router, updating the software of the application, launching the software with wizard, checking active SIM profile, checking, and changing configuration of router unit 106 and so on. Also, an option to check speed of the internet may be selected using icon 704 in GUI 700B. By selecting icon 704, the application may run a speed test algorithm to determine and display the speed of the internet. In an embodiment, an option to view details of cell towers associated with the SIMs may also be provided to the user. By selecting such option, GUI 700C may be displayed on the device. One or more other options, known to person skilled in the art, may be provided to the user to perform other actions. The other actions may include, but are not limited to, uninstalling the application, control the router, disconnecting the internet access, controlling configuration of the cellular modem 114 and the one or more antennas and so on.

Figure 8:
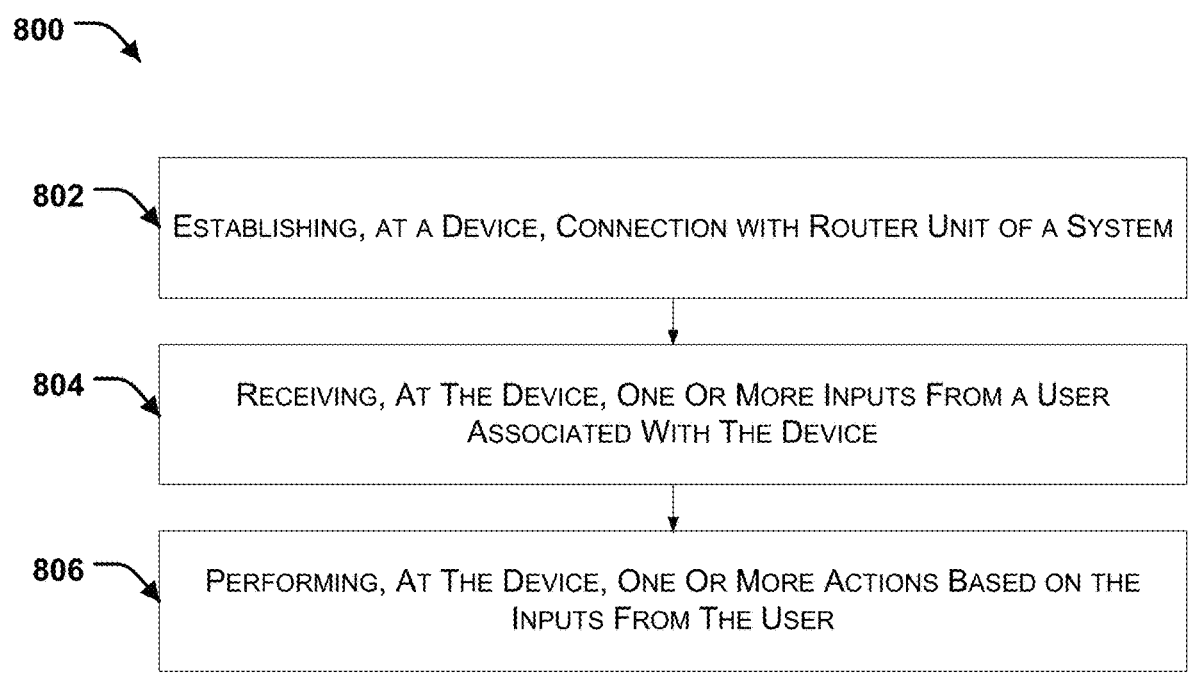
FIG. 8 is a flow diagram illustrating the process of using application of system, in accordance with an embodiment of the present disclosure.

FIG. 8 is a flow diagram illustrating the process of using application of system, in accordance with an embodiment of the present disclosure. As shown in FIG. 8, an example method of using the application includes steps of establishing connection with a router unit of a system, as shown at block 802, receiving one or more inputs from a user associated with device as shown at block 804, and performing one or more actions based on the one or more inputs from the user as shown at block 806.

Figure 9:
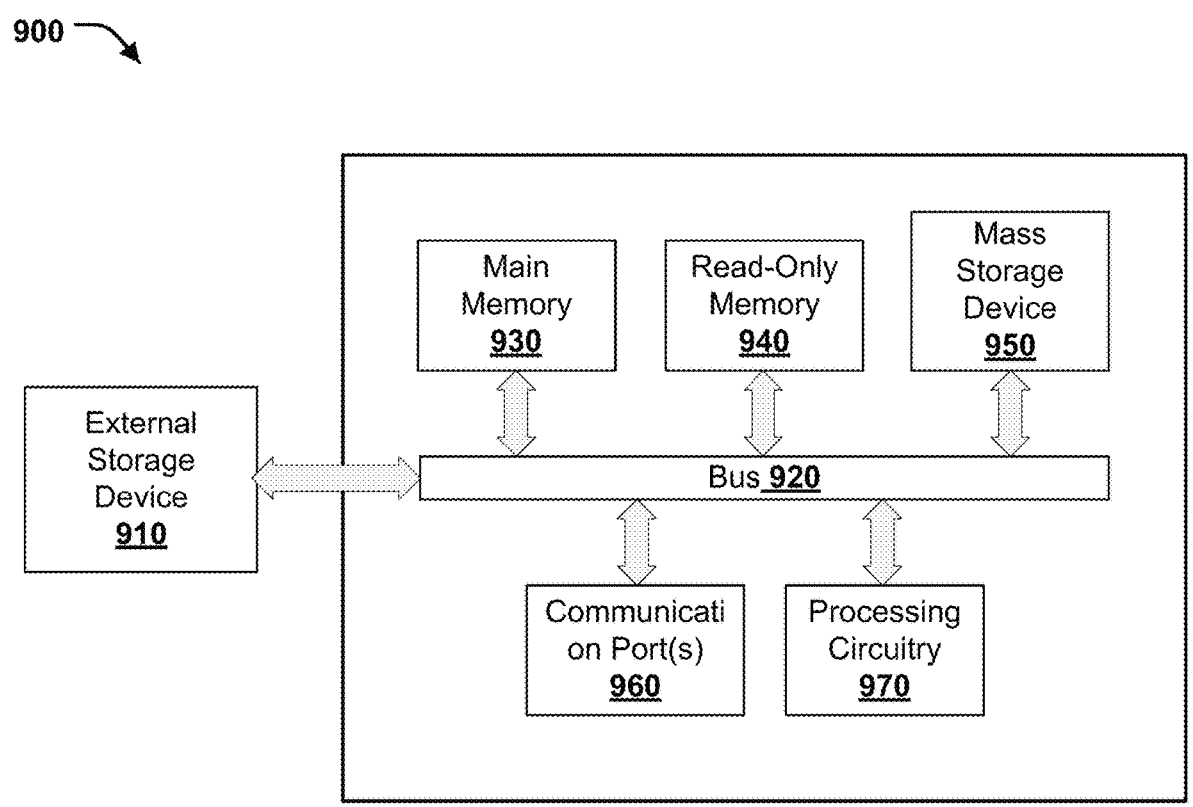
FIG. 9 illustrates an exemplary computer system in which or with which embodiments of the present disclosure may be utilized.

FIG. 9 illustrates an exemplary computer system in which or with which embodiments of the present disclosure may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction. As shown in FIG. 9, the computer system includes an external storage device 910, a bus 930, a main memory 930, a read-only memory 940, a mass storage device 950, a communication port 960, and a processing circuitry 970.

Those skilled in the art will appreciate that computer system 900 may include more than one processing circuitry 970 and communication ports 960. Processing circuitry 970 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, Hexa-core, or any suitable number of cores) or supercomputer. In some embodiments, processing circuitry 970 is distributed across multiple separate processors or processing units, for example, multiple of the same type of processing units (e.g., two Intel Core i7 processors) or multiple different processors (e.g., an Intel Core i5 processor and an Intel Core i7 processor). Examples of processing circuitry 970 include, but are not limited to, an Intel® Itanium® or Itanium 2 processor(s), or AMD® Opteron® or Athlon MP® processor(s), Motorola® lines of processors, System on Chip (SoC) processors, or other future processors. The processing circuitry 970 may include various modules associated with embodiments of the present invention.

Communication port 960 may include a cable modem, Integrated Services Digital Network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. Communication port 960 can be any of an RS-232 port for use with a modem-based dialup connection, a 10/100 Ethernet port, a Gigabit or 10 Gigabit port using copper or fiber, a serial port, a parallel port, or other existing or future ports. Communication port 960 may be chosen depending on a network, such as a Local Area Network (LAN), Wide Area Network (WAN), or any network to which the computer system connects.

Main memory 930 may include Random Access Memory (RAM) or any other dynamic storage device commonly known in the art. Read-only memory 940 can be any static storage device(s), e.g., but not limited to, a Programmable Read-Only Memory (PROM) chips for storing static information, e.g., start-up or BIOS instructions for processing circuitry 970.

Mass storage device 950 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement storage memory. Memory 930 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Desk star 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

Bus 920 communicatively connects processor(s) with the other memory, storage, and communication blocks. Bus 920 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 970 to a software system.

Optionally, operator and administrative interfaces, e.g., a display, keyboard, and a cursor control device, may also be coupled to bus 920 to support direct operator interaction with the computer system. Other operator and administrative interfaces can be provided through network connections connected through communication port 960. An external storage device 910 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

Computer system 900 may be accessed through a user interface. The user interface application may be implemented using any suitable architecture. For example, it may be a stand-alone application wholly implemented on computer system 900. The user interface application and/or any instructions for performing any of the embodiments discussed herein may be encoded on computer-readable media. Computer-readable media includes any media capable of storing data. In some embodiments, the user interface application is a client server-based application. Data for use by a thick or thin client implemented on an electronic device computer system 900 is retrieved on-demand by issuing requests to a server remote to the computer system 900. For example, computing device 900 may receive inputs from the user via an input interface and transmit those inputs to the remote server for processing and generating the corresponding outputs. The generated output is then transmitted to computer device 900 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only.

Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "includes" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter outlined in the claims is not intended to be limited to the embodiments shown herein but is to be accorded to the widest scope consistent with the principles and novel features disclosed herein. It is contemplated that additional embodiments are within the spirit and true scope of the disclosed subject matter.

I claim:

1. A system for providing internet to one or more user devices, the system comprising: an exterior unit, placed in an open environment, wherein the exterior unit comprises:
   a detachable cellular modem configured to receive signals from one or more antennas via a first interface and transmit data to a router unit of the system via a second interface, the detachable cellular modem comprises:
a modem housing to accommodate a Subscriber Identify Module (SIM) slot unit having plurality of SIM slots, said SIM slot unit is interconnected with one or more connectors to enable connectivity via the first interface and the second interface;
an antenna and modem housing arrangement comprises:
an antenna arrangement to accommodate the one or more antennas in communication with one or more cell towers, at slant polarization;
a modem holding housing to accommodate the detachable cellular modem;
the router unit, placed in proximity to one or more user devices, said router unit is connectable with the one or more user devices for providing internet to the one or more user devices;
an application configured to provision at least one of:
receiving one or more inputs from at least one user associated with the one or more user devices;
performing, based on the one or more inputs, one or more actions comprising at least one of: selecting one of plurality of SIMs, inserted in the plurality of SIM slots, to be internet provider for the one or more user devices;
checking speed of internet provided by the internet provider; and displaying information related to cell towers associated with internet providers of each the plurality of SIMs.

2. The system of claim 1, wherein the antenna and modem housing arrangement further comprises:
a detachable modem locking and sealing mechanism designed to be fitted to the modem holding housing, to hold the detachable cellular modem within the modem holding housing.

3. The system of claim 1, further comprises:
a mounting pole to enable mounting of the exterior unit at a predefined distance from a surface in the open environment.

4. The system of claim 1, the antenna arrangement is designed to be one of angel wing antenna and binocular antenna.

5. The system of claim 1, wherein the one or more connectors comprise a Multiple In Multiple Out (MIMO) antenna connector for establishing connection via the first interface for transmission of the signals from the one or more antennas to the detachable cellular modem, wherein the detachable cellular modem converts the signals from the one or more antennas to the data to be transmitted to the router unit.

6. The system of claim 1, wherein the MIMO connector is one of 2×2 MIMO connector and 4×4 MIMO connector.

7. The system of claim 1, wherein the one or more connectors comprise a Universal Serial Bus (USB) connector for establishing connection via the second interface for transmission of the data from the detachable cellular modem to the router unit.

8. The system of claim 1, wherein the router unit supports at least one 802.11ac Wireless (Wi)-Fidelity (Fi) Access Point (AP) with one of 2.4 GHz radio band and 5 GHz radio band, and ethernet connection.

9. The system of claim 1, wherein the exterior unit is mounted on an outside surface of a recreational vehicle and the router unit is placed within interior of the recreational vehicle.

10. A device comprises:
a non-transitory computer readable medium having stored thereon computer implementable instructions executable by a processor in the device to, at least one of:
establish connection with a router unit of a system to access internet provided by the system, wherein the system comprises:
an exterior unit, placed in an open environment, wherein the exterior unit comprises:
a detachable cellular modem configured to receive signals from one or more antennas via a first interface and transmit data packets to the router unit via a second interface, the detachable cellular modem comprises:
a modem housing to accommodate a Subscriber Identify Module (SIM) slot unit having plurality of SIM slots, said SIM slot unit is interconnected with one or more connectors to enable the first interface and the second interface;
an antenna and modem housing arrangement comprises:
an antenna arrangement to accommodate the one or more antennas in communication with one or more cell towers, at slant polarization;
a modem holding housing to accommodate the detachable cellular modem;
and
the router unit, placed in proximity to the device,
receive one or more inputs from a user associated with the device; and
perform, based on the one or more inputs, one or more actions comprising at least one of:
selecting one of plurality of SIMs inserted in the plurality of SIM slots, to be internet provider for one or more user devices associated with the system;
checking speed of internet provided by the internet provider; and
displaying information related to cell towers associated with internet providers of each the plurality of SIMs.

11. A non-transitory computer readable medium having stored thereon computer implementable instructions executable by a processor in a computing device to perform at least one of:
establishing a connection with a router unit of a system to access internet provided by the system, wherein the system comprises:
an exterior unit, placed in an open environment, wherein the exterior unit comprises:
a detachable cellular modem configured to receive signals from one or more antennas via a first interface and transmit data packets to the router unit via a second interface, the detachable cellular modem comprises:
a modem housing to accommodate a Subscriber Identify Module (SIM) slot unit having plurality of SIM slots, said SIM slot unit is interconnected with one or more connectors to enable the first interface and the second interface;
an antenna and modem housing arrangement comprises:
an antenna arrangement to accommodate the one or more antennas in communication with one or more cell towers, at slant polarization;

a modem holding housing to accommodate the detachable cellular modem; and the router unit, placed in proximity to the device, receive one or more inputs from a user associated with the device; and perform, based on the one or more inputs, one or more actions comprising at least one of:
- selecting one of plurality of SIMs inserted in the plurality of SIM slots, to be internet provider for one or more user devices associated with the system;
- checking speed of internet provided by the internet provider; and
- displaying information related to cell towers associated with internet providers of each the plurality of SIMs.

* * * * *